United States Patent [19]
Gilmore

[11] Patent Number: 5,440,215
[45] Date of Patent: Aug. 8, 1995

[54] ELECTRICAL POWER TOOL HAVING A MOTOR CONTROL CIRCUIT FOR INCREASING THE EFFECTIVE TORQUE OUTPUT OF THE POWER TOOL

[75] Inventor: Alan A. Gilmore, Baltimore, Md.

[73] Assignee: Black & Decker Inc., Newark, Del.

[21] Appl. No.: 87,932

[22] Filed: Jul. 6, 1993

[51] Int. Cl.⁶ ............................................. H02P 7/00
[52] U.S. Cl. .................... 318/432; 388/811; 388/907.5; 388/916; 388/930; 388/937; 173/178
[58] Field of Search ............... 388/937, 809–823, 388/901.5, 930, 904, 916; 318/432, 434, 798–811; 173/2, 11, 176, 178–179

[56] References Cited

U.S. PATENT DOCUMENTS

| | | |
|---|---|---|
| 3,564,372 | 2/1971 | Vogelsberg et al. |
| 4,893,067 | 1/1990 | Bhagwat et al. .................... 388/817 |
| 5,077,824 | 12/1991 | Nagata et al. ....................... 388/819 |
| 5,154,242 | 10/1992 | Soshin et al. ....................... 173/178 |
| 5,166,585 | 11/1992 | Koharagi et al. .................... 318/254 |

Primary Examiner—David S. Martin
Attorney, Agent, or Firm—Harness, Dickey & Pierce

[57] ABSTRACT

A power tool such as an electric drill typically contains a gear train that couples the output spindle of the motor to the tool bit-receiving chuck and has associated therewith a degree of looseness which must be taken up before torque from the motor is applied to the tool bit. The control circuit for the power tool increases the effective torque output of the tool after a predetermined torque level is attained, by alternately turning the motor on and off, with the duration of the off-time sufficient to permit the gear train to relax, thus giving the motor a "running start" when power is reapplied. Various alternative schemes for transitioning to this ratcheting mode of operation are disclosed including the sensing of a predetermined threshold current, a predetermined increase in motor current, and a predetermined rate of deceleration in motor speed. The control circuit preferably provides the operator with means for adjusting the transition point as well as for varying the duration of the on-time in the ratcheting mode. A corresponding method for controlling the operation of the electric motor of a power tool is also disclosed.

38 Claims, 5 Drawing Sheets

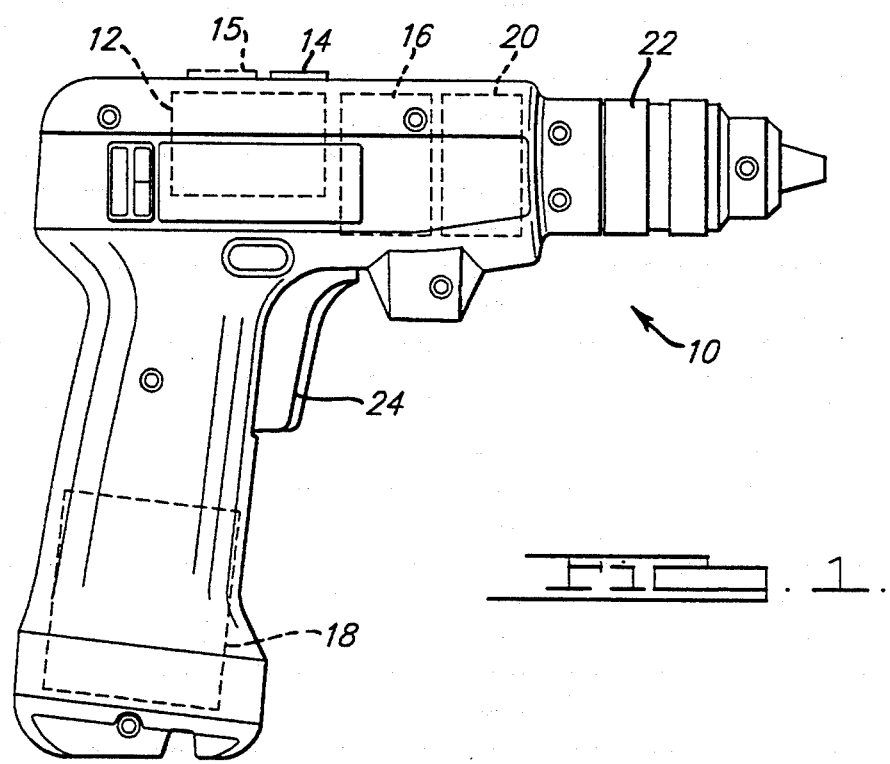
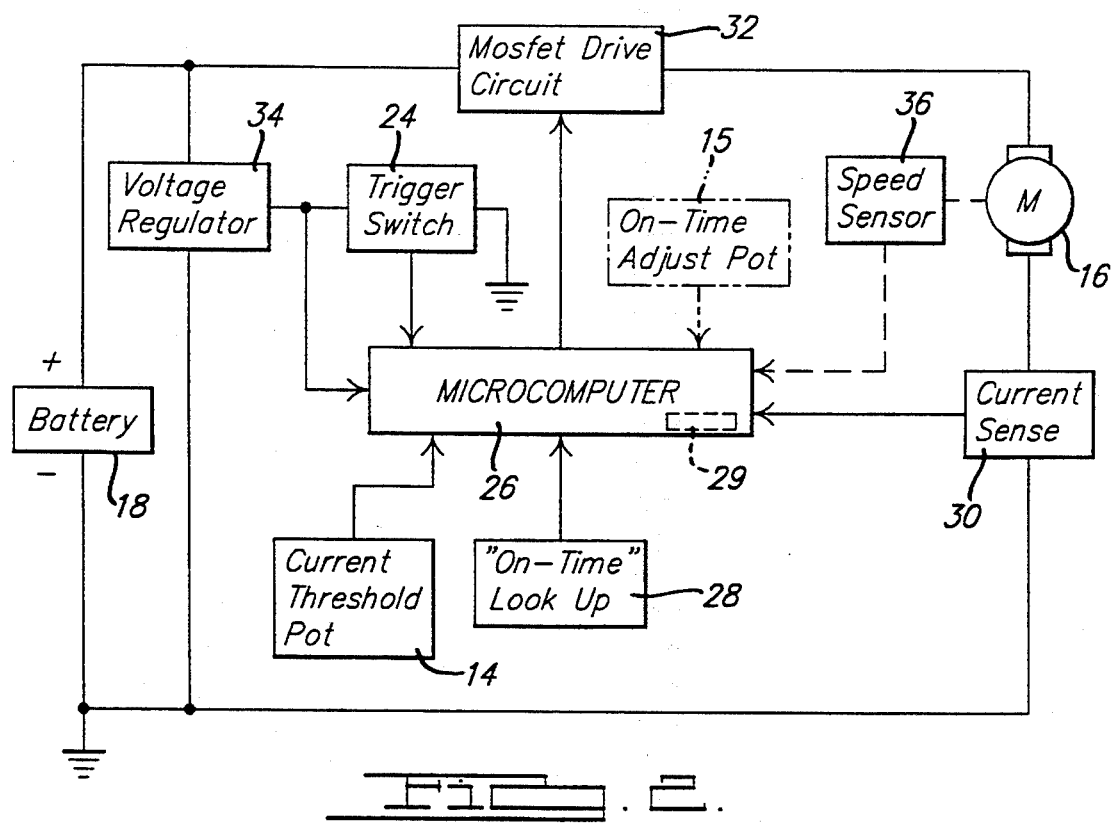
FIG. 1.
FIG. 2.

ELECTRICAL POWER TOOL HAVING A MOTOR CONTROL CIRCUIT FOR INCREASING THE EFFECTIVE TORQUE OUTPUT OF THE POWER TOOL

TECHNICAL FIELD

This invention relates to electrically driven power tools and, in particular, to a power tool such as a variable speed drill having a motor control that is adapted to increase and better control the effective torque output of the tool.

BACKGROUND OF THE INVENTION

Electrical power tools, such as variable speed drills and power screwdrivers, typically include a motor control circuit that is adapted to control the speed of the output spindle of the tool by controlling the amount of current supplied to the motor. The desired motor speed is usually selected by the operator by varying the position of the trigger switch.

If the power tool is provided with an open loop motor control circuit, the speed of the output spindle of the tool will decrease as the tool is loaded and the current drawn by the motor will increase. Accordingly, if a relatively constant output speed is desired, the operator must manually compensate for the reduction in motor speed as the tool is loaded by further retracting the trigger switch to increase the power applied to the motor. If the power tool is provided with a closed loop motor control circuit, the control circuit is typically designed to automatically increase the amount of power supplied to the motor as the output spindle of the tool is loaded in order to maintain the desired speed.

Thus, when employed in a power screwdriver to drive a screw into a workpiece, for example, the current drawn by the motor will increase as the torque required to drive the screw increases, regardless of whether the control circuit provides open or closed loop control. This operation will continue until either the operator releases the trigger or the motor stalls as the increased torque required to drive the screw exceeds the torque capacity of the tool. Consequently, the effectiveness of many portable power tools, particularly power screwdrivers, is directly related to the tool's maximum torque output capacity. Obviously, the greater the output capacity of the tool, the more useful and versatile the tool. However, in order to significantly increase the torque output capacity of a tool, it is generally regarded as being necessary (assuming changes to the gear train are not an option) to increase the size of the motor and, consequently, the size, weight, and cost of the tool.

Accordingly, it is the primary object of the present invention to provide a portable electrical power tool having a motor speed control circuit that is able to substantially increase the effective torque output of a power tool for a given size motor and gear train.

In addition, it is an object of the present invention to provide a portable electric power tool, such as a power screwdriver having a motor control circuit, that enables the operator to better control the torque output of the tool, which is particularly beneficial when driving a screw into a workpiece.

The motor control circuit employed in the present invention is able to achieve these objectives by intermittently pulsing the motor fully on and then fully off for predetermined periods of time after a threshold current level is attained. More specifically, it has been found that if the motor of a power drill is turned completely off for a length of time sufficient to allow the gear train coupled to the motor to at least partially "relax", and then full voltage is reapplied to the motor, the motor is able to build up potential energy before the looseness (i.e., backlash) is removed in the gear train. In effect, the motor is afforded a "running start" while the gear train is relaxed. When the backlash in the gear train is removed, the sudden impact of the motor torque on the gear train causes a sudden and high burst of torque to be imparted to the output spindle of the drill, and hence to the driving bit secured thereto. When this "full on" and "full off" control of the motor is alternately repeated, the motor is able to provide a series of bursts of torque to the gear train which in turn can be used to better finish driving a wood screw into and below the surface of a workpiece. The present control scheme thus provides better user control due to the fact that the screw does not rotate too much when static friction is overcome. Rather, with each torque pulse, static friction is overcome and the screw is incremented a fraction of a turn.

While the alternately full-on and full-off operation described above has been found to be particularly helpful and effective when used to drive wood screws and other like implements into a work surface, it has also been found to be an effective means for "breaking loose" a screw or like fastener which is tightly seated in a workpiece, where other forms of power tools such as conventional variable speed drills are unable to do so. By reversing the action of the variable speed drill and applying the alternating full-on and full-off operation described above, the bursts of high torque applied by the motor have been found to be extremely effective in overcoming the high level of stiction force required to initiate removal of such fasteners.

Accordingly, it is a further object of the present invention to provide an electrically driven power tool, such as a variable speed power drill, which incorporates a control circuit for controlling a motor thereof such that the motor can be alternately pulsed fully on and then fully off at a predetermined cycle time during operation of the drill.

It is another object of the present invention to provide an electrically driven power tool having such a control circuit that further provides an operator of the power tool with a means for adjusting the point at which the alternating full-on and full-off operation is initiated.

It is yet another object of the present invention to provide an electrically driven power tool which automatically enters the alternating full-on and full-off mode of operation when the current through the motor exceeds an operator adjustable threshold level setting.

Finally, it is an alternative object of the present invention to provide an electrically driven power tool that provides the operator with control over the magnitude of the torque bursts during the alternating phase of operation of the tool.

SUMMARY OF THE INVENTION

The above and other objects are provided by a portable electric power tool having an electronic control circuit and method in accordance with preferred embodiments of the present invention. The control circuit is preferably disposed within the housing or body of the electrically driven power tool, which is represented illustratively herein as a variable speed power drill. The control circuit generally comprises operator adjustable means for setting a threshold current level which defines a transition point at which alternating on and off operation of the motor is initiated; a trigger switch for selecting the desired speed of the motor; a current sensing circuit for sensing the current flowing through the motor; a switching circuit for controlling the flow of current to the motor; and a controller for comparing the current sensed by the current sensing circuit relative to the threshold current level selected by the operator and controlling the switching circuit to control the amount of current applied to the motor. When the current drawn by the motor exceeds the selected current threshold level, the controller is adapted to temporarily interrupt current flow for a predetermined "off-time" interval, and then reapply a maximum current signal for a predetermined on-time interval, and to alternate this on and off operation until the trigger switch is released.

The off-time interval during which the controller causes the switching circuit to temporarily interrupt current flow to the motor is sufficient to allow the gear train coupled to the motor of the power tool to sufficiently "relax" before maximum current is reapplied to the motor. A value representing this time duration is preferably stored in a memory of the controller and is unique to the gear train of the particular power tool being controlled.

By alternately applying a maximum current signal for a desired time and then interrupting current flow for a predetermined time, the motor of the power tool is caused to generate successive "bursts" of torque to the gear train of the power tool which significantly increases the effective torque output of the power tool. This technique further has been found to be extremely effective in "breaking loose" tightly set wood screws and the like, which other conventionally controlled power tools having comparable-sized motors are unable to achieve.

In several preferred embodiments of the invention, a memory is included for storing a plurality of predetermined "on-times" which the controller accesses depending on the setting of the current threshold level setting means. Thus, on-times of varying duration can be selected by the controller to precisely meet the anticipated conditions of a specific application.

In an alternative preferred embodiment of the present invention, the current comparison performed by the controller is modified in accordance with the changing (i.e., increasing) speed of the motor as the trigger switch is squeezed during operation of the power tool to increase motor speed. In this instance the threshold current level signal selected by the operator is decreased as the speed of the motor increases. With this embodiment a speed sensor is employed to monitor the speed of the motor and provide a signal representative thereof to the controller. As the speed of the motor increases due to progressive engagement of a trigger of the power tool, the controller decrements the operator-selected threshold current level signal. This alternative embodiment further helps to compensate for the inertia of the gear train at higher motor speeds and helps provide even more consistent results independent of the motor speed of the power tool.

In yet another alternative preferred method of operation of the present invention, the transition point for beginning the alternating on and off operation (referred to also as the "ratcheting mode" of operation) of the motor is determined in accordance with a predetermined percentage increase in the sensed motor current. With this method the current through the motor is initially measured. After a predetermined time delay, a second current measurement is made. This operation is repeated continuously until the second current measurement exceeds the initial current measurement by a predetermined factor. At that point the controller initiates the alternating on and off operation of the motor. In this embodiment the operator-adjustable threshold current level means is replaced by a means for allowing the operator to adjust the desired on-time of the motor once the ratcheting mode of operation has begun.

This embodiment and method of operation thus provides a method for "automatically" sensing the size of a screw (and thus the torque required to drive the screw) as the operator begins driving the screw into a workpiece, based on the initial current reading. Since the current required to drive a large screw is greater, in the initial stage, than that required for a small screw, setting the transition point in accordance with a predetermined increase in current (e.g., 25% or 50%) automatically serves to adjust the transition point at which the ratcheting mode of operation begins in accordance with the size of the screw being driven.

In yet another alternative preferred mode of operation of the present invention, the transition point is determined by a predetermined drop in motor speed. In this embodiment, the ratcheting mode of operation of the motor is initiated when the motor speed drops below a predetermined speed, or by a predetermined amount (i.e., percentage), or by a predetermined rate.

In a further alternative embodiment, it has been determined to be advantageous to provide the operator with control over the magnitude of the torque bursts during the ratcheting mode of operation. In other words, rather than providing fixed on-time/off-time periods during the ratcheting mode of operation, it may also be desirable to provide the operator with the ability to continue to vary the duty cycle of the voltage signal during the ratcheting mode of operation in accordance with the position of the trigger switch.

In particular, conventional variable speed power tools control the speed of the motor by varying the duty cycle of the voltage signal supplied to the motor. The frequency of the duty cycle signal is set sufficiently high—typically 2 KHz to 12 KHz—so that the motor operates smoothly even though the power is actually being rapidly cycled on and off. The percentage on-time of the duty cycle signal, and hence the average power level, supplied to the motor is controlled by the operator in accordance with the position of the trigger switch.

Consequently, it will be appreciated that the transition from normal variable speed control of the motor to the above-described ratcheting-mode of operation can be viewed simply as a change in the frequency of the duty cycle control signal. In other words, the ratcheting mode of operation can be achieved simply by switching from a relatively high frequency control signal to a relatively low frequency control signal (e.g., 10–50 Hz), the period of which is greater than the response time of the motor. Considered in this manner, it is readily apparent that it is possible to continue to provide trigger switch control over the duty cycle of the control signal during the ratcheting or low frequency mode of operation, and thereby provide the operator with the ability to control the magnitude of the torque bursts. This, in turn, provides the operator with greater control when seating a screw into a workpiece.

BRIEF DESCRIPTION OF THE DRAWINGS

The various advantages of the present invention will become apparent to one skilled in the art by reading the following specification and subjoined claims and by referencing the following drawings in which:

FIG. 1 is an elevational side view of a typical variable speed power drill with which the control circuit of the present invention may be used;

FIG. 2 is a simplified block diagram of a preferred embodiment of the control circuit of the present invention;

FIG. 6 is a flowchart of another alternative method of control in which the current through the motor of the power tool is measured repeatedly and the ratcheting mode is implemented when the current increases by a predetermined factor from an initial measurement;

DETAILED DESCRIPTION OF THE PREFERRED EMBODIMENTS

Figure 3:
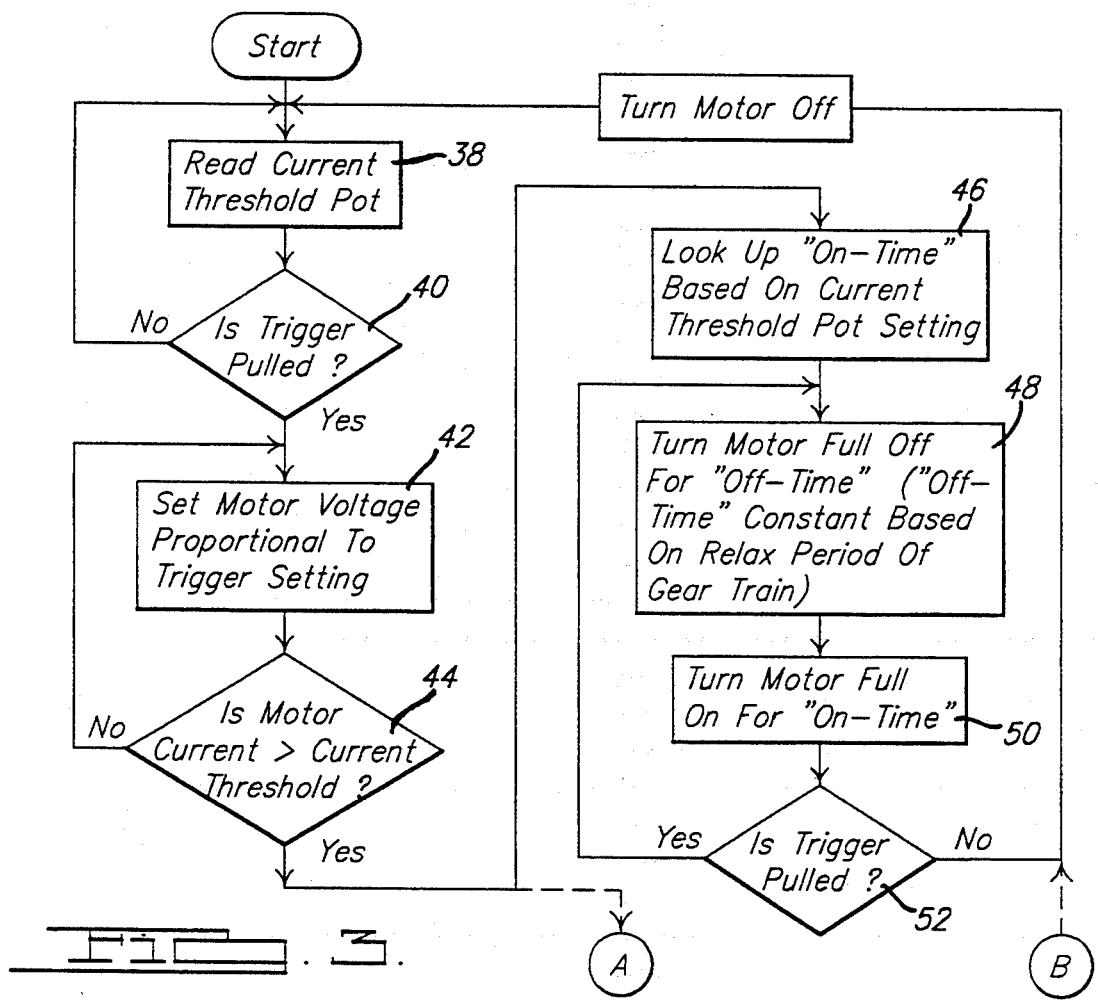
FIG. 3 is a flowchart of the steps of operation performed by the control circuit in implementing the alternating on and off, or "ratcheting" or low frequency, mode of operation.

Referring to FIG. 1, an electrically driven power tool in the form of a cordless (i.e., battery driven) variable speed power drill 10 incorporating an electronic control circuit 12 in accordance with preferred embodiments of the present invention is illustrated. As will readily be appreciated by those skilled in the art, the motor control circuit taught by the present invention is adaptable to other types of electrical power tools, such as power screwdrivers, electric pop rivet guns, and the like. The control circuit 12 includes a current threshold potentiometer 14 which is disposed in a convenient position on the drill 10 to allow an operator to conveniently adjust the potentiometer 14 as needed. The function of this potentiometer 14 will subsequently be described in greater detail.

Optionally included is an on-time adjustment potentiometer 15 which may be used in lieu of potentiometer 14 in an alternative preferred embodiment of the present invention. The on-time potentiometer 15 provides an operator with direct control over the on-time interval implemented during the "ratcheting" mode of operation of the motor 16. It will be appreciated, however, that potentiometers 14 and 15 could easily be used simultaneously to provide the operator with control over the point at which the ratcheting mode of operation begins as well as the duration of the on-time, if such is desired.

The drill 10 includes, in conventional fashion, a motor 16 and a rechargeable battery 18 for powering the motor 16. While the drill 10 has been illustrated as battery powered, it will be appreciated that the control circuit 12 of the present invention could just as easily be used with an A/C powered drill with little or no modification, provided suitable phase control circuitry is included.

The motor 16 of the drill is adapted to drive through a conventional gear train 20, a tool bit-receiving chuck 22. A trigger switch 24 controls the battery voltage across the motor 16 and therefore the current flowing through the motor 16 to provide an operator with the capability of varying the speed of the chuck 22 to suit various work needs.

With reference to FIG. 2, a block diagram of a preferred embodiment of the control circuit 12 is illustrated. The control circuit 12 is used to implement the alternating on and off operation of the motor 16, which will hereafter be referred to as the "ratcheting" mode or low frequency mode of operation.

The control circuit 12 generally includes a controller 26 in the form of a microcomputer, the threshold current level potentiometer 14, a memory device 28 such as a read-only memory (ROM), and a current sensing circuit 30 coupled in series with the motor 16. A switching circuit in the form of a metal oxide silicone field effect transistor (MOSFET) drive circuit 32 is provided for controlling the voltage applied across the motor 16 and thus the current flow through the motor 16, in accordance with the duty cycle of the pulse width modulated ("PWM") control signal received from the microcomputer 26. The on-time adjustment potentiometer 15 is also shown in phantom indicating its presence as being optional.

The controller circuit 12 further includes the trigger switch 24 which provides a signal to the microcomputer 26 in accordance with the degree of retraction thereof by the operator. A DC battery pack 18 and a conventional voltage regulator 34 connected across the battery are provided for supplying a regulated DC voltage across the motor 16 and to the microcomputer 26.

The control circuit 12 may optionally include a speed sensor 36 for sensing the speed of the motor 16 and providing a signal in accordance therewith to the microcomputer 26. The speed sensor 34 may take the form of a variety of well-known speed sensing devices such as optical encoders or Hall-effect sensors which are capable of supplying a series of pulses to the microcomputer 26 which are representative of the frequency of rotation of the motor 16. The use of the speed sensor 34 will be described in greater detail hereinafter in connection with an alternative preferred embodiment of the present invention.

The microcomputer 26 preferably is comprised of an 8-bit microprocessor which includes an on-board memory 29, preferably in the form of read-only memory (ROM), for storing, inter alia, a constant which in the preferred embodiment represents an "off-time" duration sufficient to allow the gear train 20 of the drill 10 to completely relax after current flow to the motor 16 is interrupted. The microcomputer 26 also accesses the memory 28 to read a plurality of values stored in a look-up table therein which represents varying on-time intervals for leaving the motor 16 fully on when the ratcheting mode is implemented. Finally, the microcomputer 26 is responsive to the threshold current level potentiometer 14 to provide an operator with the capability of adjusting the point at which the ratcheting mode of operation is to begin. This point will be referred to hereafter as the "transition" point.

It should be appreciated that the relax time, and thus the desired off-time, will vary from tool to tool depending on the design of the gear train. Accordingly, power tools such as drills having gear trains of differing design will most likely require different off-times to allow their gear trains to completely relax. The off-time for a specific gear train design may be determined by any suitable testing procedure which provides a relatively accurate determination of the time interval required, once torque is removed from the gear train, for the gear train to return to a "relaxed" condition. With the preferred embodiments described herein, an off-time within a range of about 20 ms to 100 ms provides sufficient time for the gear train to completely relax, although this can vary greatly depending upon the particular type of tool.

In addition, it will be appreciated that it is not critical to the present invention that the duration of the off-time period be sufficient to enable the gear train of the power tool to completely relax. In particular, if the off-time period is such that the gear train is allowed to only partially relax, an enhanced torque effect will nonetheless be realized when power is reapplied, but simply to a lesser degree than if the gear train is allowed to completely relax.

With reference to FIG. 3, a description of the operation of the control circuit 12 will now be provided. Initially, the microcomputer 26 reads the current threshold level selected by the operator via the current threshold potentiometer 14, as indicated at step 38, and waits for the operator to activate the trigger switch, as indicated at step 40.

If the test at step 40 proves true, the microcomputer 26 controls the MOSFET drive circuit 32 to provide a voltage signal across the motor 16 which is proportional to the degree of engagement of the trigger 24, as indicated at step 42. The microcomputer 26 then reads the output from the current sensing circuit 30 to determine if the motor current is greater than the current threshold signal provided by the current threshold potentiometer 14, as indicated at step 44. If this test proves false, then steps 42 and 44 are repeated until step 44 proves true.

When the test at step 44 proves true, the microcomputer 26 accesses the look-up table stored in the memory 28, as indicated at step 46, to obtain the appropriate on-time to be used during the ratcheting mode of operation. The microcomputer 26 then causes the MOSFET drive circuit 32 to interrupt current flow to the motor 16 for the predetermined off-time, as indicated at step 48. When the off-time interval has expired, the microcomputer 26 causes the MOSFET drive circuit 32 to reapply a maximum current flow to the motor 16 for the predetermined on-time interval, as indicated at step 50. As discussed previously herein, the off-time interval is preferably of a duration sufficient to allow the gear train 20 to completely relax.

When the on-time interval has expired, the microcomputer 26 again checks to determine if the trigger 24 is still engaged, as indicated at step 52. If this test proves true, then steps 48–52 are repeated until the test at step 52 proves false. When the test at step 52 proves false, indicating that the work operation is complete, the power to the motor is disconnected and the program returns to the start.

In the preferred embodiments of the present invention, the maximum current signal is a current signal which is sufficiently large to drive the motor at or near its maximum rated speed. This current signal is further applied and removed in a rapid, pulse-like fashion such that the motor 16 "sees" virtually instantaneous "turn-on" and "turn-off" signals.

Optionally, a plurality of varying on-times may be stored in the memory 28 to enable the length of time during which the maximum current signal is applied to be correlated more precisely to the setting of the current threshold potentiometer 14. For example, if the transition point is set to occur at about 80% of maximum rated current flow, then a shorter on-time may be desirable than that required if the transition point is set to 90% of maximum rated current flow. Thus, by varying the on-time interval in accordance with the current threshold potentiometer 14, the duration of the on-time can be chosen by the microcomputer to maximize the torque producing capability of the motor 16 to suit the needs of specific applications.

Figure 4:
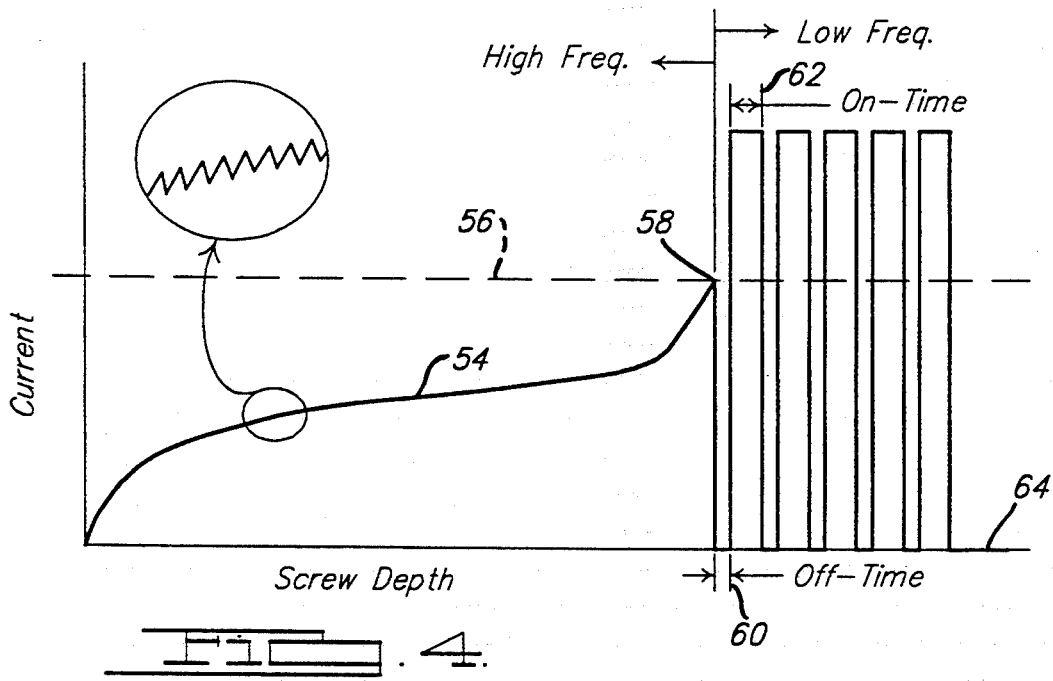
FIG. 4 is a graph of the current flow through the motor verses the depth of a screw being driven in by a power tool incorporating the control circuit of the present invention while a trigger of the power tool is held steady in an engaged position.

Referring to FIG. 4, a graph shows an exemplary current flow through the motor 16 (and thus the torque generated by the motor 16) as regulated by the control circuit 12 when installing a wood screw completely into a piece of wood. Initially, the current flow through the motor 16 is substantially continuous, as represented by curve 54. In actuality, due to the relatively high frequency of the PWM control signal, there exists a corresponding high frequency ripple in the motor current during this mode of operation. When the motor current exceeds the threshold current level 56 set via the current threshold potentiometer 14, which represents the transition point 58, the ratcheting or low frequency mode is initiated. Current flow to the motor 16 is quickly interrupted for the predetermined off-time 60 to allow the gear train 20 in the preferred embodiment to completely relax. After this time interval has expired, the microcomputer 26 causes the MOSFET drive circuit 32 to rapidly apply maximum current flow to the motor 16. This maximum current flow is maintained for the on-time 62 read from the look-up table in the memory 28. The cycle is then repeated until such time as the microcomputer 26 detects that the trigger switch 24 of the drill 10 has been released, as indicated by portion 64 of the waveform.

Importantly, it will be appreciated, for purposes of the scope of the present invention as described herein and as claimed, that it is irrelevant whether the ratcheting mode of operation is initiated by an "off" time period, as shown in FIG. 4, or an "on" time period. Consequently, when the control circuit is described herein as initially interrupting power to the motor in response to the detection of the transition point, it is to be understood that the control circuit could just as readily initially apply full power to the motor in response to the detection of the transition point.

Figure 8:
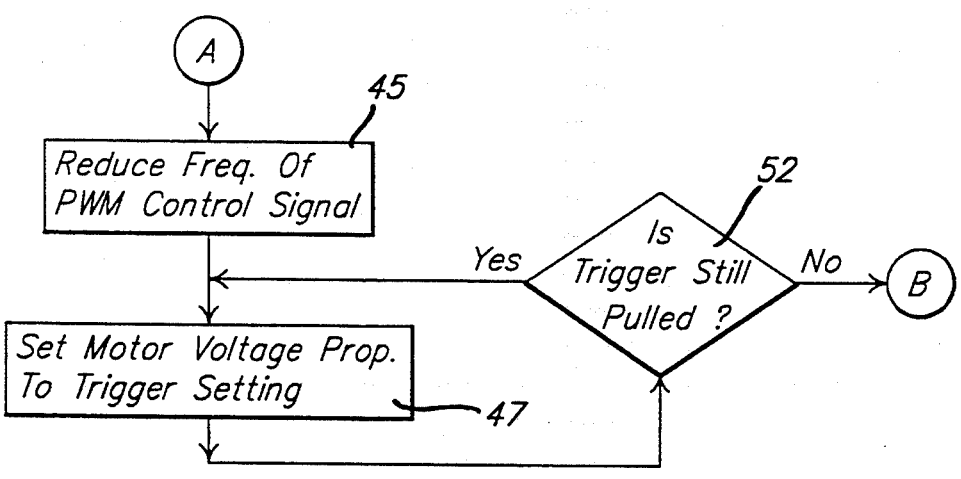
FIG. 8 is a partial flowchart diagram of an alternative manner of controlling the power tool during the ratcheting or low frequency mode of operation illustrated in FIG. 3.

Alternatively, it is readily possible to modify the software algorithm illustrated in FIG. 3 so that the operator of the power tool is able to control the magnitude of the torque bursts during the low frequency or ratcheting mode of operation. In particular, rather than providing fixed on-time and off-time periods as shown in FIG. 3, the microcomputer 26 can be programmed to merely reduce to a relatively low level the frequency of the PWM control signal and continue to set the motor voltage proportional to the position of the trigger switch. This alternative control scheme is illustrated in FIG. 8. In this embodiment, during the low frequency mode, the percentage on-time of the duty cycle signal, and hence the average motor voltage signal, supplied to the motor is set in accordance with the position of the trigger switch 24. Thus, following detection of the transition point, the microcomputer 26 reduces the frequency of the PWM control signal at step 45 to a predetermined relatively low level, typically between 10–50 Hz. This frequency level is selected to be sufficiently low such that the period of the PWM control signal is substantially greater than the response time of the motor 16. In particular, the period of each cycle of the PWM control signal during the low frequency mode of operation must be sufficiently greater than the response time of the motor to enable the gear train of the power tool to at least partially relax during the off-time portion of the cycle, which, of course, will be something less than the total time period of each cycle, depending on the position of the trigger switch. In other words, at step 47 the microcomputer is programmed in this embodiment to set the percentage duty cycle of the PWM control signal in accordance with the position of the trigger switch. This will produce corresponding on-time and off-time periods which, added together, equal the period of one cycle of the PWM control signal. Consequently, the duration of the off-time portion of each cycle must be long enough, at least at moderate trigger switch settings, to permit at least partial relaxation of the gear train for the advantages of the present invention to be realized. In a typical variable speed drill, a frequency of 10–50 Hz has been found to be acceptable, although this too can vary depending upon the characteristics of a particular tool.

In this embodiment, therefore, the operator is able to control the magnitude of the torque bursts, and thus control the rate at which a screw is seated into a workpiece, by varying the position of the trigger switch. Accordingly, the operator can, for example, achieve a quarter turn or a half turn of the screw with each torque burst depending upon the position of the trigger switch, and thus properly seat a screw into a workpiece in a very controlled manner. Consequently, the present invention avoids the dilemma of risking the over-application of a large burst of power to finish setting a screw and inadvertently causing the screw to be set too deeply below the surface of the workpiece.

Figure 5:
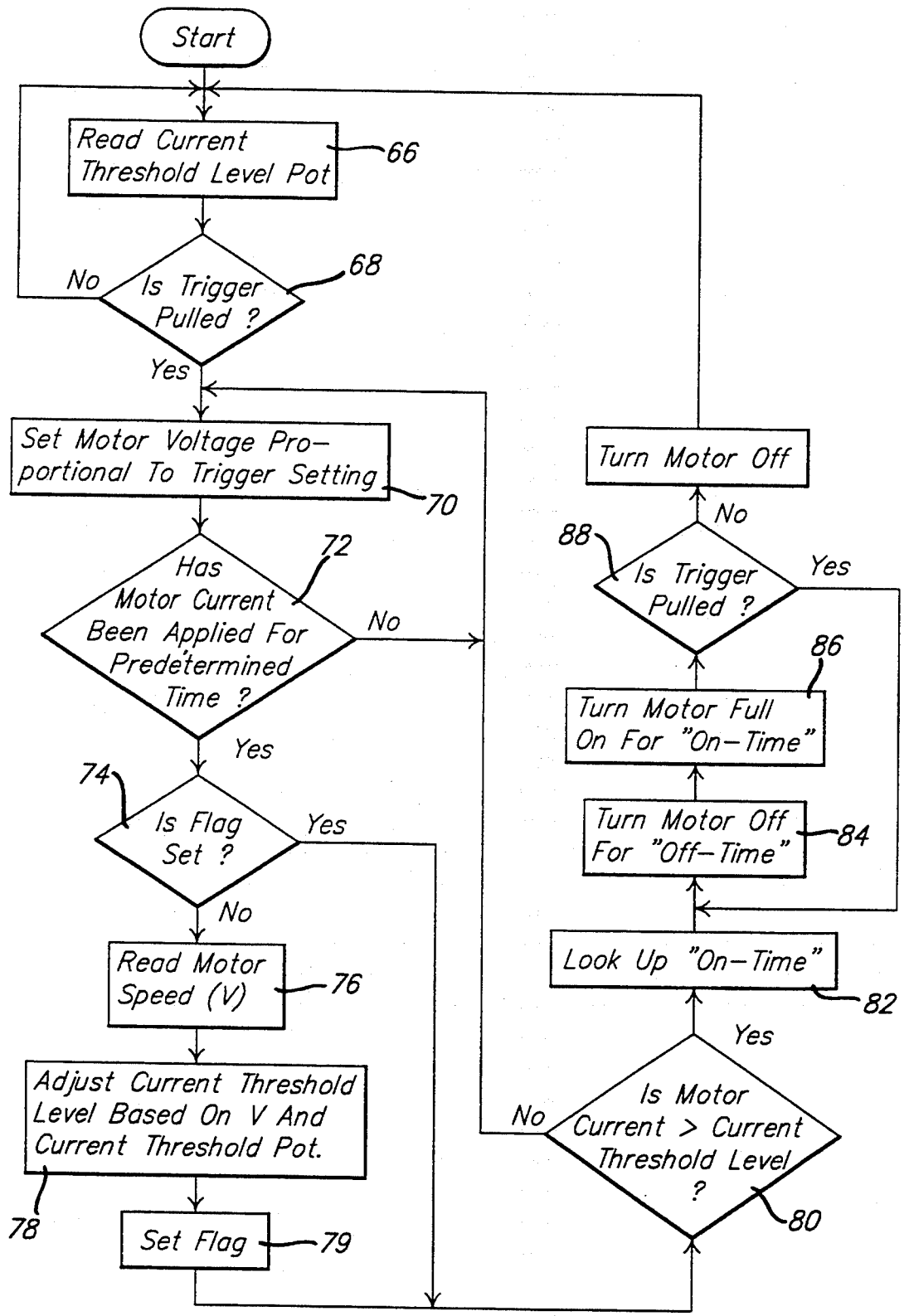
FIG. 5 is a flowchart of an alternative method of control for determining the transition point as to when the ratcheting mode of operation is to begin.
Figure 5:
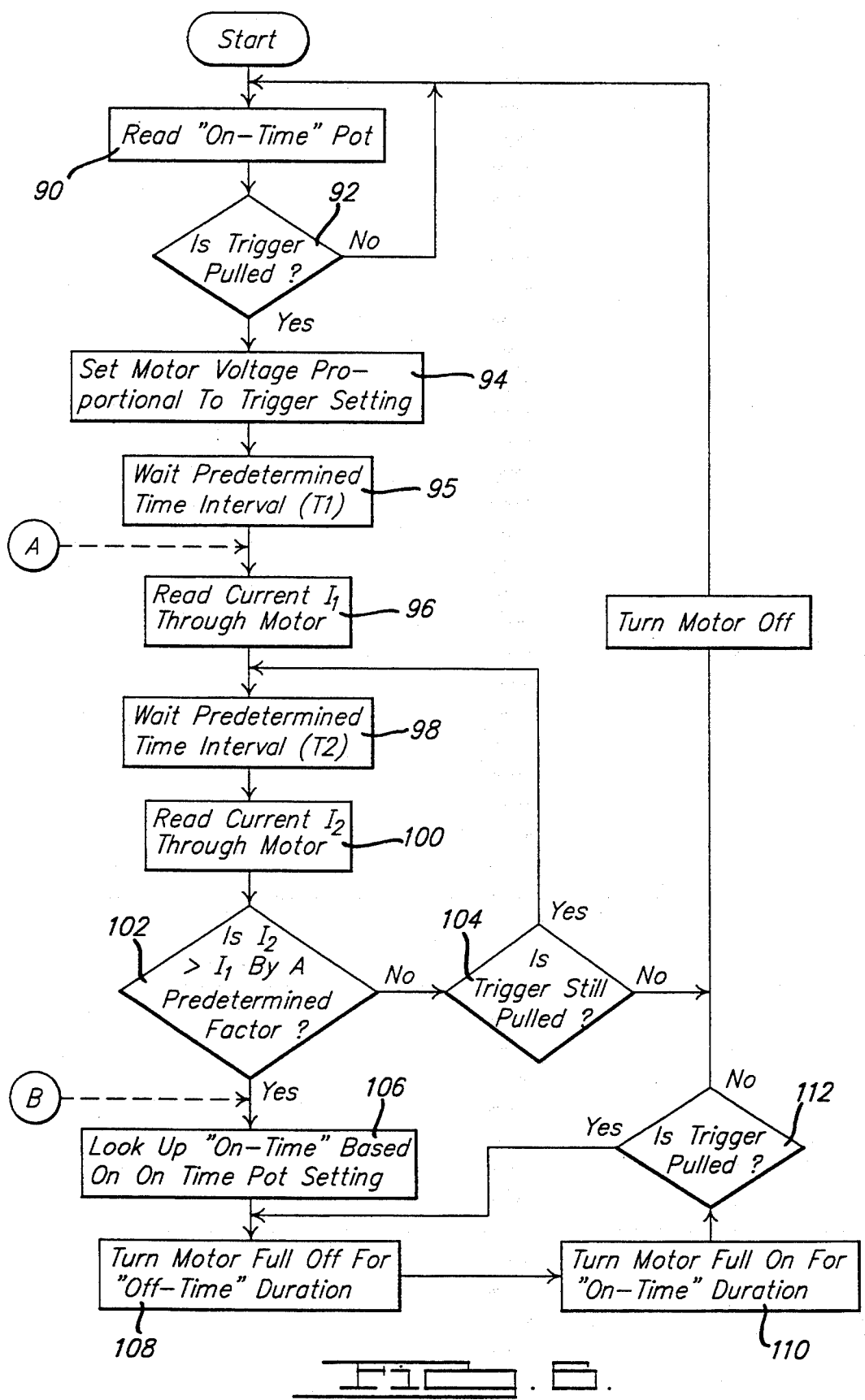
Figure 7:
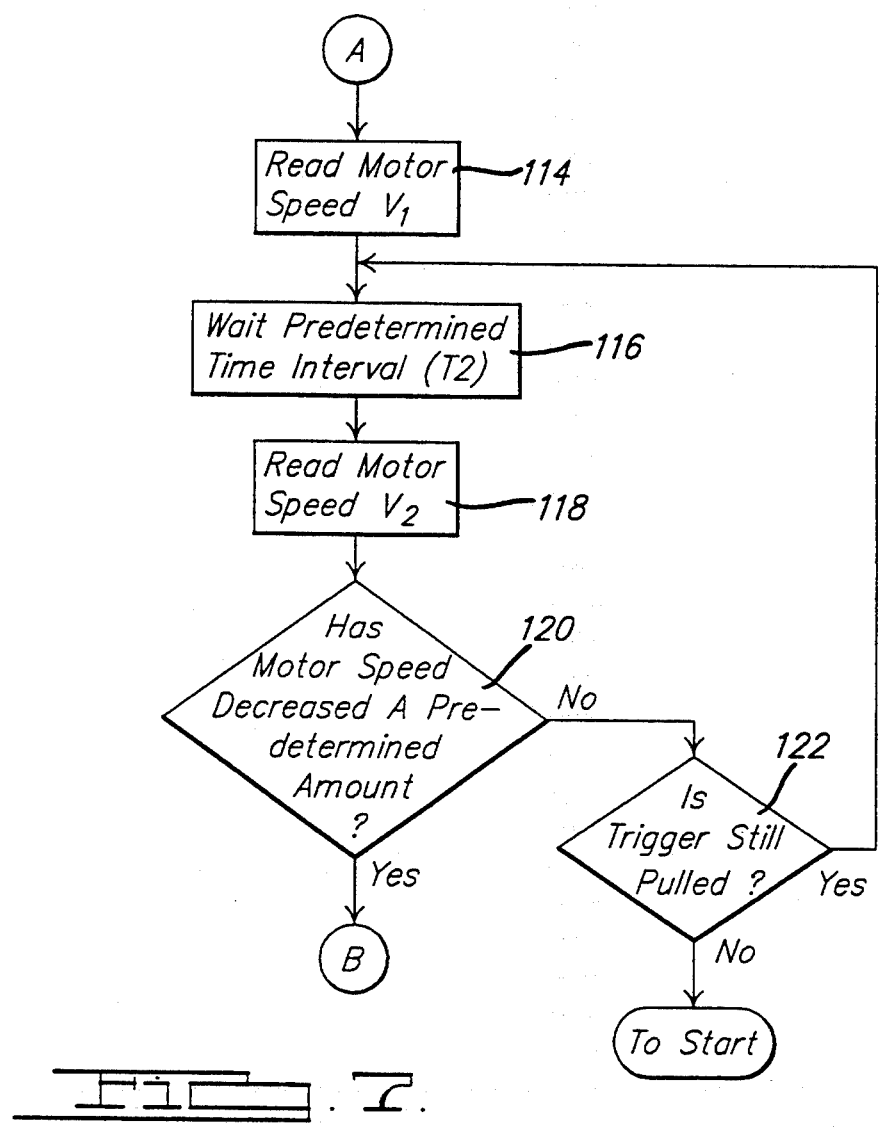
FIG. 7 is a flowchart of another alternative preferred method of control for determining an appropriate transition point by sensing for a predetermined drop in motor speed.

Referring now to FIGS. 5–7, various alternative methods for determining the appropriate time to transition from the high frequency mode to the ratcheting or low frequency mode of operation are disclosed. With initial reference to FIG. 5, the control circuit 12 in this embodiment not only monitors the current flowing through the motor 16 to detect when the transition point has occurred, but also incorporates the use of the speed sensor 36 (shown in FIG. 2) to modify the threshold current level signal provided by the current threshold potentiometer 14 as set by the operator. In particular, the suitability of a particular current threshold is dependent upon the speed of the motor when the threshold is attained. In other words, as motor speed is increased, the amount of inertia in the system increases which will cause a screw to continue to turn after the motor has been turned off. Consequently, in order to provide consistent results, it is preferable to adjust the current threshold in accordance with the speed of the motor at a particular point during the screw setting process that is relatable to the projected speed of the motor when the threshold is attained.

As set forth in the flowchart diagram, the microcomputer 26 initially reads the current threshold potentiometer 14, as indicated at step 66, and waits for the operator to actuate the trigger switch 24, as indicated at step 68. Once the microcomputer 26 detects that the trigger 24 has been pulled, the appropriate motor voltage is set proportional to the trigger setting, as indicated at step 70.

The microcomputer then waits a predetermined time period, as indicated at decision step 72. Once this time period has elapsed, the speed of the motor (V) is read at step 76, and then the current threshold level is adjusted based upon the actual speed of the motor (V) at this point and the setting of the current threshold potentiometer 14, as indicated at step 78. Next, a flag is set (step 79) so that the adjustment process is not repeated (decision step 74) and the program continues in the loop until the motor current exceeds the adjusted current threshold level 80.

If the test at step 80 proves true, then the microcomputer 26 accesses the look-up table in the memory 28 to determine the appropriate on-time, as indicated at step 82, to be applied during the ratcheting mode of operation. The microcomputer 26 then begins the ratcheting mode by turning the motor 16 full-off for the off-time, as indicated at step 84, and then turning the motor 16 full-on for the selected on-time, as indicated at step 86. Another check is then made to determine if the trigger 24 is still being pulled by the operator, as indicated at step 88. If this test proves true, then steps 84, 86, and 88 are repeated until the test at step 88 proves false, whereupon power to the motor is terminated.

The alternative method of control set forth in FIG. 5 thus provides a means by which the transition point can be modified proportionally with differences in motor speed. This allows the control circuit 12 to compensate for the inertia generated at high motor speeds which continues to apply torque to the screw after the motor 16 is turned off. Accordingly, this method can provide even more consistent results in determining the most effective transition point independent of how fast the motor 16 is being operated.

Referring now to FIG. 6, another alternative method of control for determining the appropriate transition point is set forth. This method essentially involves monitoring the current flow through the motor 16 to determine when the current flow has increased by a predetermined factor (for example, doubled or tripled), for signalling the microcomputer 26 to implement the ratcheting mode of operation. With this method of control the optional on-time potentiometer 15 (FIGS. 1 and 2) may be incorporated to provide direct operator control over the on-time interval during the ratcheting mode of operation in lieu of the current threshold potentiometer 14.

Once the operator has actuated the trigger switch (step 92), the on-time potentiometer 15 is read, as indicated at step 90, and the motor voltage is set proportional to the setting of the trigger 24, as indicated at step 94. After a first predetermined time interval (T1), a first current flow reading $I_1$ through the motor 16 is taken, as indicated at step 96. The microcomputer 26 then waits a second predetermined time interval (T2), as indicated at step 98, before taking a second current reading $I_2$ through the motor 16, as indicated at step 100. A test is then made by the microcomputer 26 to determine if $I_2$ is greater than $I_1$ by a predetermined factor, as indicated at step 102. If this test proves false, the microcomputer 26 checks to see if the trigger 24 is still pulled, as indicated at step 104 and, if so, repeats steps 98, 100, and 102 until the test at step 102 proves true.

When the test at step 102 proves true, the microcomputer 26 accesses the memory 28 to obtain the appropriate on-time value from the look-up table, as indicated at step 106. The microcomputer 26 then controls the MOSFET drive circuit 32 to interrupt current flow to the motor 16, as indicated at step 108, thus initiating the ratcheting mode of operation.

The current flow is interrupted for the preset off-time duration, after which a maximum current flow signal is applied to the motor 16 for the selected on-time, as indicated at step 110. The ratcheting mode of operation is repeated until the microcomputer 26 detects that the trigger switch 24 has been released, as indicated at step 112, whereupon the power to the motor is terminated.

The alternative method of control described above in connection with FIG. 6 provides a method for determining the transition point which also "automatically" senses the size of the screw being installed based on the first current reading at step 96. Accordingly, this method has the advantage of automatically tailoring the transition point to occur at an appropriate time to accommodate different size wood screws. As will be readily appreciated by those skilled in the art, the program illustrated in FIG. 6 can also be readily modified to detect a predetermined percentage increase in motor current or a predetermined rate of increase in motor current as the transition event before switching to the ratchet mode of operation.

Yet another alternative method of determining the transition point is shown in connection with FIG. 7. The steps shown in FIG. 7 may be implemented in lieu of steps 96–102 of the method described in connection with FIG. 6. With reference to FIG. 7, after steps 90–95 of FIG. 6 have been performed, the motor 16 speed $V_1$ is read as indicated at step 114. The microcomputer 26 then waits a predetermined time interval (T2), as indicated at step 116, before again reading the motor 16 speed $V_2$, as indicated at step 118. A test is then made to determine if the motor 16 speed has decreased a predetermined amount (for example, by 50 percent), as indicated at step 120. If this test proves false, a check is made to determine if the trigger 24 is still being pulled, as indicated at step 122. If this test proves false, the method loops back to the very start of the program as indicated in FIG. 6.

If the test at step 122 proves true, then steps 116 through 120 are repeated. Once the test at step 120 proves true (i.e., the motor 16 speed has decreased by a predetermined amount) the ratcheting mode of operation is implemented in accordance with steps 106–110 of FIG. 6. Optionally, of course, the test at step 120 could be modified to detect a predetermined percentage drop in motor speed or a predetermined rate of deceleration.

By the method described in connection with FIG. 7, a relatively simple sequence of operation is provided for determining an appropriate transition point at which the ratcheting mode of operation is to occur which also takes into account the size of the wood screw being driven, as well as the hardness of the wood into which the wood screw is being driven. By sensing for a predetermined amount or percentage drop in motor speed, the ratcheting mode can be implemented at appropriate times for a variety of applications to optimize the effectiveness of the tool.

The method of FIG. 7 also does not require the use of the current threshold potentiometer 14. Moreover, the on-time potentiometer 15 is also not required for this preferred method of control.

With all of the embodiments described herein, it will be appreciated that the ratcheting or low frequency mode of operation could easily be employed, with little or no modification, to break loose tightly seated wood screws, nuts, etc. where the continuous application of torque proves ineffective. It will also be appreciated that the ratcheting or low frequency mode of operation disclosed herein could also be adapted with little or no modification for a variety of power tools including, but not limited to, power rivet tools, for example, to help unjam such tools as needed.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A power tool having a tool holder, gear means coupled to said tool holder, operator actuable input means, and an electric motor for driving said tool holder via said gear means, said gear means having associated therewith a degree of looseness that must be taken up before torque from said motor is transferred to said tool holder and which further results in said gear means relaxing after power to said motor is interrupted; the improvement comprising:
   current sensing means for sensing a current flow through the motor of the power tool; and
   control means responsive to actuation of said input means for controlling the power supplied to the motor, and further responsive to said current sensing means for detecting when the current through the motor has exceeded a predetermined current level and thereupon, with said input means actuated, repetitively interrupting and reapplying power to the motor such that the off-time intervals are of sufficient duration to enable the gear means to at least partially relax.

2. The power tool of claim 1 further comprising operator adjustable means in communication with said control means for adjusting said predetermined current level.

3. The power tool of claim 1 wherein said control means includes memory means for storing a plurality of selectable off-time intervals.

4. The power tool of claim 1 wherein said off-time interval is sufficient to permit said gear means of said power tool to completely relax after current through said motor is completely interrupted.

5. An electrical power tool having a control circuit for controlling the motor of the electrical power tool such that said motor alternately develops maximum and minimum levels of torque when a predetermined loading upon said motor is reached during operation of said power tool, said control circuit comprising:
   means for sensing a current flow through said motor;
   switching means for controlling said current flow through said motor;
   controller means responsive to said current sensing means for controlling said switching means to thereby control said current flow through said motor;

means for providing an operator-adjustable current threshold signal to said controller means;

memory means in communication with said controller means for storing information corresponding to a plurality of predetermined on-time intervals;

such that when said current flow detected by said current sensing means exceeds said current threshold signal said controller means causes said switching means to cyclically interrupt current flow through said motor for a time interval in accordance with a predetermined off-time interval sufficient to allow a gear train associated with said motor to at least partially relax, and apply a maximum current signal to said motor in accordance with a selected one of said predetermined on-time intervals.

6. The power tool of claim 5 further comprising speed sensor means for monitoring the speed of said motor and providing a signal in accordance therewith to said controller means.

7. The power tool of claim 6 wherein said controller means modifies said current threshold signal in accordance with said signal received from said speed sensing means.

8. A method for controlling a motor of an electric power tool such that said motor is caused to repetitively generate substantial variations in torque output once a predetermined current flow through said motor is reached, said method comprising the steps of:
 applying power to the motor in accordance with an operator actuable switch means;
 providing a current threshold level;
 sensing the current flow through said motor of said power tool;
 comparing said sensed current flow through said motor against said current threshold level; and
 with said switch means actuated, repetitively cycling the motor on and off when said current flow through said motor exceeds said current threshold level such that current flow through said motor is alternatively turned off for a predetermined off-time sufficient to allow a gear train associated with said motor to at least partially relax, and after said predetermined off-time has expired, current flow is re-established through said motor for a predetermined on-time interval.

9. The method of claim 8 wherein said operator actuable switch means
 comprises an operator-controllable trigger switch for controlling the speed of said motor; and further comprising the steps of:
 sensing the speed of said motor; and
 vary said current threshold level in accordance with said sensed motor speed.

10. A method for controlling a motor of an electrically driven power tool such that said motor is caused to be driven alternately full on and off during operation of said power tool, the method comprising the steps of:
 providing a motor voltage in accordance with the position of an operator-actuable trigger switch;
 taking a first reading of the current ($I_1$) through said motor;
 waiting a predetermined time interval;
 taking a second current reading ($I_2$) through said motor;
 comparing $I_2$ with $I_1$ to determine if $I_2$ is greater than $I_1$ by at least a predetermined factor;
 when $I_2$ is greater than $I_1$ by at least said predetermined factor,
 interrupting current flow to said motor to thereby turn said motor full-off for a predetermined off-time duration, where said off-time duration is sufficient to allow a gear train of said power tool to at least partially relax, and
 after said off-time duration has expired, providing a maximum current flow to said motor to thereby turn said motor full-on for a predetermined on-time;
 when said on-time duration has expired, determining whether said trigger switch is still being actuated; and
 if said trigger is still being actuated, repeating said steps of alternately interrupting current flow and applying a maximum current flow until said trigger is released by the operator.

11. A method for controlling a motor of an electrically driven power tool such that said motor is caused to be driven alternately full on and off during operation of said power tool, the method comprising the steps of:
 providing a motor voltage in accordance with the position of an operator-actuable trigger;
 taking a first reading of the speed of said motor;
 waiting a predetermined time interval;
 taking a second reading of the speed of said motor;
 when said second reading has decreased in magnitude from said first reading by a predetermined amount, interrupting current flow to said motor for an off-time sufficient to allow a gear train associated with said motor to at least partially relax;
 after said off-time has expired, applying a maximum current signal to said motor for a predetermined on-time;
 determining if said trigger switch is still actuated; and
 if said trigger switch is still actuated, repeating said steps of alternately interrupting current flow and applying a maximum current flow until said trigger switch is released by the operator.

12. A power tool having a tool holder, gear means coupled to said tool holder, and an electric motor for driving said tool holder via said gear means, said gear means having associated therewith a degree of looseness which must be taken up before torque from said motor is transferred to said tool holder and which further results in said gear means relaxing after power to said motor is interrupted; the improvement comprising a control circuit for controlling the application of power to said motor including sensing means for sensing an operating parameter of said motor, and controller means responsive to said sensing means for detecting a predetermined occurrence in said operating parameter and thereupon cyclically interrupting power to said motor for an off-time sufficient to enable said gear means to at least partially relax and reapplying power to said motor for an on-time to enable said motor to build up potential energy as the looseness in said gear means is taken up to thereby cause substantial repetitive variations in the torque applied to the tool holder.

13. The power tool of claim 12 wherein said sensing means comprises a current sensor for sensing the current being drawn by said motor and said controller means is adapted to detect a predetermined change in said motor current.

14. The power tool of claim 13 wherein said controller means is adapted to detect when said motor current exceeds a predetermined level.

15. The power tool of claim 14 wherein said control circuit further includes adjustment means for varying said predetermined current level.

16. The power tool of claim 15 wherein said controller means is adapted to automatically vary said on-time in accordance with the setting of said predetermined current level.

17. The power tool of claim 14 further including a speed sensor for sensing the rotational speed of said motor, and further wherein said controller means is further adapted to vary said predetermined current level in accordance with the sensed rotational speed of the motor.

18. The power tool of claim 13 wherein said controller means is adapted to detect when said motor current has increased by a predetermined amount.

19. The power tool of claim 13 wherein said controller means is adapted to detect when said motor current has increased by a predetermined percentage amount.

20. The power tool of claim 13 wherein said controller means is adapted to detect when the rate of increase in motor current exceeds a predetermined level.

21. The power tool of claim 12 wherein said sensing means comprises a speed sensor for sensing the rotational speed of the motor and said controller means is adapted to detect a predetermined change in motor speed.

22. The power tool of claim 21 wherein said controller is adapted to detect a predetermined decrease in motor speed.

23. The power tool of claim 21 wherein said controller is adapted to detect a predetermined percentage decrease in motor speed.

24. The power tool of claim 21 wherein said controller is adapted to detect a predetermined rate of deceleration in motor speed.

25. The power tool of claim 12 wherein said control circuit further includes adjustment means for varying said on-time.

26. A method of controlling a power tool having a tool holder, gear means coupled to said tool holder, and an electric motor for driving said tool holder via said gear means, said gear means having associated therewith a degree of looseness which must be taken up before torque from said motor is transferred to said tool holder and which further causes said gear means to relax after power to said motor is interrupted; the method comprising the steps of:

applying power to said motor, monitoring an operating parameter of said motor, detecting a predetermined occurrence in said operating parameter, and thereupon cyclically interrupting power to said motor for an off-time sufficient to enable said gear means to at least partially relax and reapplying power to said motor for an on-time to enable said motor to build up potential energy as the looseness in said gear means is taken up to thereby increase the effective torque output of said motor.

27. The method of claim 26 wherein said monitoring step comprises sensing the current being drawn by said motor and said detecting step comprises detecting a predetermined change in said motor current.

28. The method of claim 27 wherein said detecting step comprises detecting when said motor current exceeds a predetermined level.

29. The method of claim 28 wherein said detecting step comprises detecting when the rate of increase in motor current exceeds a predetermined level.

30. The method of claim 28 further including the step of selectively setting said predetermined current level.

31. The method of claim 30 further including the step of automatically adjusting said on-time in accordance with the setting of said predetermined current level.

32. The method of claim 28 further including the steps of sensing the rotational speed of the motor and adjusting said predetermined current level in accordance with said sensed speed.

33. The method of claim 27 wherein said detecting step comprises detecting when said motor current has increased by a predetermined amount.

34. The method of claim 27 wherein said detecting step comprises detecting when said motor current has increased by a predetermined percentage amount.

35. The method of claim 26 wherein said monitoring step comprises sensing the rotational speed of the motor and said detecting step comprises detecting a predetermined change in motor speed.

36. The method of claim 35 wherein said detecting step comprises detecting a predetermined decrease in motor speed.

37. The method of claim 35 wherein said detecting step comprises detecting a predetermined percentage decrease in motor speed.

38. The method of claim 35 wherein said detecting step comprises detecting a predetermined rate of deceleration in motor speed.

* * * * *